G. H. PERTUISET.
SPEED REGULATING PULLEY FOR MOTOR CYCLES.
APPLICATION FILED FEB. 16, 1910.
976,596.
Patented Nov. 22, 1910.
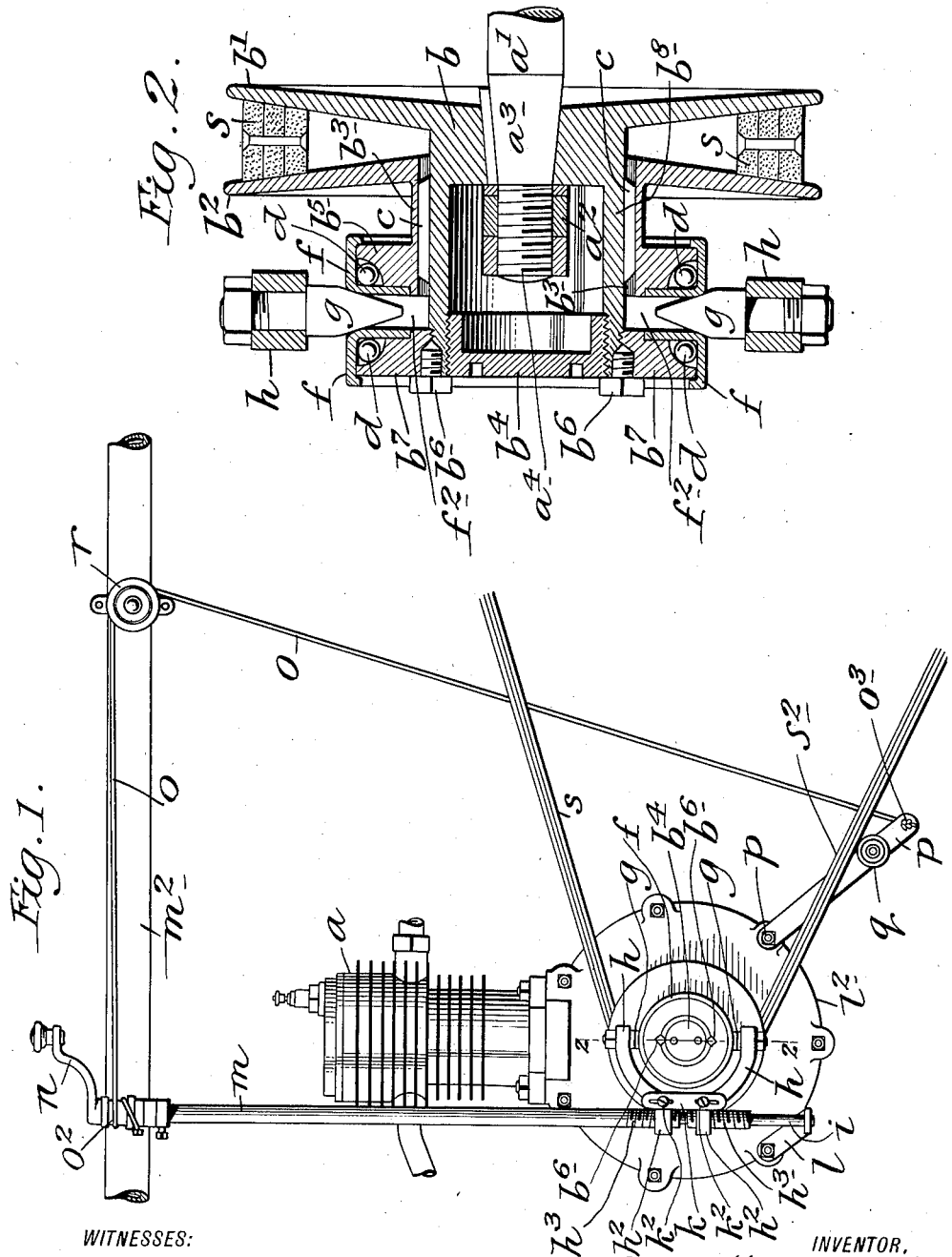

UNITED STATES PATENT OFFICE.

GEORGES HENRI PERTUISET, OF GENEVA, SWITZERLAND.

SPEED-REGULATING PULLEY FOR MOTOR-CYCLES.

976,596.  Specification of Letters Patent.  Patented Nov. 22, 1910.

Application filed February 16, 1910. Serial No. 544,168.

*To all whom it may concern:*

Be it known that I, GEORGES HENRI PERTUISET, a citizen of Switzerland, and residing at Geneva, Switzerland, have invented certain new and useful improvements in Speed-Regulating Pulleys for Motor-Cycles, of which the following is a specification, such as will enable those skilled in the art to which it appertains to make and use the same.

This invention relates to motor cycles, and particularly to means for regulating the speed thereof, and the invention consists of an improved speed regulating pulley in connection with which the driving belt operates, said pulley being mounted on and used in connection with the crank shaft of the motor; and with this and other objects in view the invention consists in a device of the class specified constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side elevation showing my improved speed regulating pulley in connection with a motor and showing also a part of the frame of a motor cycle and the method of using the device; and, Fig. 2 a partial section on the line 2—2 of Fig. 1.

In the accompanying drawing I have shown at $a$ the motor of an ordinary motor cycle, and at $a^1$ I have shown the crank shaft of said motor. The connection between the crank shaft and motor is not shown, but it will be understood that said crank shaft is connected with the motor in the usual manner.

The shaft $a^1$ is provided with a tapered portion $a^3$ to which is keyed a hub $b$ provided with a flange $b^1$, and the tapered portion of the shaft $a^1$ is provided with a screw threaded extension $a^4$ on which are placed nuts $a^2$. The hub $b$ is provided with a sleeve $b^8$ having keyways $c$ and mounted on said sleeve is a flange $b^2$ provided with a sleeve $b^3$, said flange $b^2$ and said sleeve $b^3$ being movable longitudinally on the sleeve $b^8$ of the hub $b$, and the flanges $b^1$ and $b^2$ form the parts of my improved pulley between which the driving belt $s$ operates. The space between flanges $b^1$ and $b^2$ is tapered, or V-shaped in form, and the driving belt $s$ is correspondingly formed.

The hub $b$ and its sleeve $b^8$ is secured on the shaft $a^1$ by the nuts $a^2$ which are inclosed by said sleeve $b^8$ of the hub $b$, and the outer end of said sleeve is closed by a cap $b^4$ which is screwed thereinto. The sleeve $b^3$ of the flange $b^2$ is provided with a collar $b^5$, and the sleeve of the hub $b$ is provided with a collar $b^7$ which is screwed on to the sleeve of the hub $b$, and when the said collar $b^7$ is screwed on to the sleeve of the hub $b$ it is prevented from backward movement by set screws $b^6$.

The collars $b^5$ and $b^7$ form annular shoulders on which are mounted annular caps $f$ which are L-shaped in cross section and are rotatable on said annular shoulder, and between which and said annular shoulders are placed balls $d$, and said annular shoulders and annular caps $f$ form an annular space $f^2$ around the outer end portion of the sleeve $b^8$ of the hub $b$, and in which fit wedge-shaped blocks $g$ which are connected with the arms $h$ of a yoke-shaped support which is connected with a vertically arranged shaft $m$. The arms $h$ of the yoke-shaped support which carries the wedge-shaped blocks $g$ are provided with threaded members $h^2$ through which the shaft $m$ passes, and said shaft is provided with separate parts $h^3$ having right and left threads, and the parts $h^2$ of the arms $h$ are correspondingly threaded, and said arms are connected by a plate $k$ which ranges parallel with the shaft $m$ and which is provided in its opposite end portions with longitudinal slots through which are passed screws $k^2$, and by means of this construction the turning of the shaft $m$ will cause the arms $h$ to move toward and from each other according to the direction in which said shaft is turned.

The lower end $i$ of the shaft $m$ is supported in an arm $l$ secured to the casing $l^2$ which incloses the crank shaft of the motor and the upper end of said shaft $m$ is rotatably connected with a horizontal member $m^2$ of the cycle frame, and said end of said shaft is provided with a crank $n$, and wound on said end of said shaft, or secured thereto at $o^2$, in any desired manner is a cord $o$ which is passed around a pulley $r$ and downwardly, and connected at $o^3$ with an arm $p$ pivoted to the frame $l^2$ at $p^2$ and provided with a roller $q$ which bears on the lower side of the bottom reach $s^2$ of the driving belt $s$. With this construction it will be seen that the turning of the shaft $m$ in one direction will result in the wedges $g$ being forced into the annular space $f^2$, and by turning said shaft $m$ in the opposite direction the said wedge-shaped blocks $g$ will be withdrawn from said annular space, and these operations will result, in one case, in the space between the annular flanges $b^1$ and $b^2$ being diminished, and, in the other case, in said space being enlarged. With the different parts in the positions shown in Figs. 1 and 2, the arms $h$ are in their most nearly adjacent position, and the flanges $b^1$ and $b^2$ are also in their most nearly adjacent position, and the driving belt $s$ operates between the outer parts, or adjacent to the perimeters, of said flanges. If now the shaft $m$ is turned so as to separate the arms $h$ the blocks $g$ will be withdrawn from the annular space $f^2$ and the belt $s$ will force the flange $b^2$ outwardly and will move inwardly in the annular space between the annular flanges $b^1$ and $b^2$, and the diameter of the pulley will be decreased, and the speed of the cycle will also be correspondingly decreased, and it will be understood that the speed of the vehicle may be increased or decreased at any time by simply turning the shaft $m$ in the desired direction, the belt $s$ moving inwardly toward the center of the pulley when said shaft is turned in one direction, and moving outwardly when the said shaft is turned in the opposite direction; and the operation of, or the turning of the shaft $m$ also results in regulating the tension of the driving belt $s$, this operation being accomplished by the cord $o$ and the arm $p$ the roller $q$ of which operates in connection with the under side of the bottom reach of said belt.

My invention is not limited to the particular means herein shown and described for operating the arms $h^2$ of the yoke-shaped holder by which the wedge-shaped blocks $g$ are supported, or to any particular means for taking up the slack in the driving belt $s$, and any suitable devices may be employed for this purpose; and various changes in and modifications of the other parts of the construction herein shown and described may be made, within the scope of the appended claims, without departing from the spirit of my invention or sacrificing its advantages.

It will be understood that the flanges $b^1$ and $b^2$ form a pulley, the diameter of which is variable or increased or decreased by the operation of the apparatus as herein described and this operation may be effected while the motor $a$ is in operation, and a continuous, progressive speed ratio without jerks or jars may thus be obtained regardless of the speed of the motor.

Having fully described my invention, what I claim as new, and desire to secure by Letters Patent, is:—

1. In an apparatus for regulating the speed of motor cycles, a motor provided with a shaft, a pulley composed of two parts, one of which is provided with a hub keyed to the shaft of the motor and having a sleeve, the other part of said pulley being provided with a sleeve movable longitudinally on the sleeve of the hub of the part which is keyed to the shaft of the motor, said sleeves being provided with annular caps which are rotatable thereon, a vertically arranged rotatable shaft, arms connected with said shaft and movable toward and from each other according to the direction in which said shaft is turned and wedge-shaped devices connected with said arms and movable radially in said annular space when said arms are moved in opposite directions by the turning of said shaft.

2. In an apparatus for regulating the speed of motor cycles, a motor provided with a shaft, a pulley composed of two parts, one of which is provided with a hub keyed to the shaft of the motor and having a sleeve, the other part of said pulley being provided with a sleeve movable longitudinally on the sleeves of the hub of the part which is keyed to the shaft of the motor, said sleeves being provided with annular caps which are rotatable thereon, a vertically arranged rotatable shaft, arms connected with said shaft and movable toward and from each other according to the direction in which said shaft is turned and wedge-shaped devices connected with said arms and movable radially in said annular space when said arms are moved in opposite directions by the turning of said shaft, a driving belt passing around said pulley and means whereby the turning of said shaft will also tighten or loosen said belt.

3. In an apparatus for regulating the speed of motor cycles, a motor provided with a shaft, a pulley composed of two parts, one of which is provided with a hub which is keyed to the shaft of a motor and provided with a sleeve, the other part of said pulley being provided with a sleeve movable longitudinally on the sleeve of the hub of the part which is keyed to the shaft of the motor, said sleeves being each provided with an annular member or shoulder between which is an annular space, a vertically arranged shaft, arms connected with said shaft and movable toward and from each other according to the direction in which said shaft is turned, and the wedge-shaped devices connected with said arms and radially movable in said annular space.

4. In an apparatus for regulating the speed of motor cycles, a motor provided with a shaft, a pulley composed of two parts, one of which is provided with a hub which is keyed to the shaft of a motor and provided with a sleeve, the other part of said pulley being provided with a sleeve movable longitudinally on the sleeve of the hub of the part which is keyed to the shaft of the motor, said sleeves being each provided with an annular member or shoulder between which is an annular space, a vertically arranged shaft, arms connected with said shaft and movable toward and from each other according to the direction in which said shaft is turned, wedge-shaped devices connected with said arms and radially movable in said annular space, a driving belt passing around said pulley and means whereby the turning of said shaft will also tighten or loosen said belt.

In testimony that I claim the foregoing as my invention I have signed my name in presence of the subscribing witnesses this 14th day of February 1910.

GEORGES HENRI PERTUISET.

Witnesses:
  B. M. Ryerson,
  C. E. Mulreany.